United States Patent
Choe et al.

(10) Patent No.: US 11,122,503 B2
(45) Date of Patent: Sep. 14, 2021

(54) METHOD AND APPARATUS FOR INTER-RAT CELL SELECTION MECHANISM IN NB-IOT

(71) Applicant: LG ELECTRONICS INC., Seoul (KR)

(72) Inventors: Hyunjung Choe, Seoul (KR); Sunghoon Jung, Seoul (KR); Hongsuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/790,606

(22) Filed: Feb. 13, 2020

(65) Prior Publication Data
US 2020/0267640 A1 Aug. 20, 2020

(30) Foreign Application Priority Data
Feb. 14, 2019 (KR) .......................... 10-2019-0017481

(51) Int. Cl.
| H04W 4/00 | (2018.01) |
|---|---|
| H04W 48/20 | (2009.01) |
| H04W 48/16 | (2009.01) |
| H04W 72/10 | (2009.01) |
| H04W 4/80 | (2018.01) |
| H04W 84/04 | (2009.01) |

(52) U.S. Cl.
CPC ............ H04W 48/20 (2013.01); H04W 4/80 (2018.02); H04W 48/16 (2013.01); H04W 72/10 (2013.01); H04W 84/042 (2013.01)

(58) Field of Classification Search
CPC ... H04W 48/20; H04W 48/16; H04W 84/042; H04W 72/10; H04W 4/80
USPC .................. 370/329, 252, 328, 331, 435
See application file for complete search history.

(56) References Cited

U.S. PATENT DOCUMENTS

| 9,491,680 | B2 * | 11/2016 | Moeglein ............ H04W 52/285 |
|---|---|---|---|
| 10,667,185 | B2 * | 5/2020 | da Silva ............ H04W 36/0069 |
| 2016/0278160 | A1 * | 9/2016 | Schliwa-Bertling ........................ H04W 72/048 |
| 2017/0034865 | A1 * | 2/2017 | Jung ...................... H04W 76/18 |
| 2017/0311375 | A1 * | 10/2017 | Jung ...................... H04W 36/08 |
| 2018/0206080 | A1 * | 7/2018 | Chen ...................... H04W 4/50 |
| 2018/0249318 | A1 * | 8/2018 | Ianev .................... H04W 76/30 |
| 2018/0324675 | A1 * | 11/2018 | Lee ....................... H04W 48/02 |
| 2019/0141586 | A1 * | 5/2019 | Olsson .................. H04W 76/25 |

(Continued)

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 15)," Section 5.2, 3GPP TS 36.304, V15.2.0, Dec. 2018, 22 pages.

(Continued)

*Primary Examiner* — Marceau Milord
(74) *Attorney, Agent, or Firm* — Lee, Hong, Degerman, Kang & Waimey

(57) ABSTRACT

A method and apparatus for inter-RAT cell selection mechanism in NB-IOT in a wireless communication system is provided. A wireless device receives a configuration related to periodic uplink transmission. A wireless device performs the periodic uplink transmission on a suitable cell. A wireless device selects other suitable cell, based on a periodicity of the periodic uplink transmission. A wireless device performs the periodic uplink transmission on the selected suitable cell.

10 Claims, 16 Drawing Sheets

(56) References Cited

U.S. PATENT DOCUMENTS

| | | | |
|---|---|---|---|
| 2019/0215885 A1* | 7/2019 | Wu | H04W 76/15 |
| 2019/0306764 A1* | 10/2019 | da Silva | H04W 36/04 |
| 2019/0349826 A1* | 11/2019 | Fan | H04W 36/08 |
| 2019/0357065 A1* | 11/2019 | Cho | H04W 24/08 |
| 2020/0053602 A1* | 2/2020 | Kadiri | H04W 36/0058 |
| 2020/0058970 A1* | 2/2020 | Schmitz | H01M 10/6569 |
| 2020/0120521 A1* | 4/2020 | da Silva | H04L 5/0048 |
| 2020/0260348 A1* | 8/2020 | da Silva | H04W 12/106 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 15)," Section 5.12, 3GPP TR 36.304 V15.2.0, Dec. 2018, 3 pages.

3rd Generation Partnership Project (3GPP), "Technical Specification Group Radio Access Network; Evolved Universal Terrestrial Radio Access (E-UTRA); User Equipment (UE) procedures in idle mode (Release 15)," Section 4.4, 3GPP TS 36.304 V15.2.0, Dec. 2018, 3 pages.

\* cited by examiner

METHOD AND APPARATUS FOR INTER-RAT CELL SELECTION MECHANISM IN NB-IOT

CROSS-REFERENCE TO RELATED APPLICATION

Pursuant to 35 U.S.C. § 119(a), this application claims the benefit of earlier filing date and right of priority to Korean Patent Application No. 10-2019-0017481, filed on Feb. 14, 2019, the contents of which are all hereby incorporated by reference herein in their entirety.

BACKGROUND

Technical Field

The present disclosure relates to a method and apparatus for inter-RAT cell selection mechanism in NB-IOT.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in R31-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

SUMMARY

For NB-IoT, priority based reselection and inter-RAT cell reselection functionalities are not supported. Thus, if a wireless device is camping on an NB-IOT cell, the wireless device could not select a cell in a higher priority than the NB-IOT cell. Therefore, studies for a wireless device camping on an NB-IOT cell to select a cell with higher RAT/frequency will be required.

In an aspect, a method performed by a wireless device in a wireless communication system is provided. A wireless device receives a configuration related to periodic uplink transmission. A wireless device performs the periodic uplink transmission on a suitable cell. A wireless device selects other suitable cell, based on a periodicity of the periodic uplink transmission. A wireless device performs the periodic uplink transmission on the selected suitable cell.

In another aspect, a wireless device in a wireless communication system is provided. A wireless device includes a transceiver, a memory, and at least one processor operatively coupled to the transceiver and the memory. At least one processor is configured to control the transceiver to receive a configuration related to periodic uplink transmission. At least one processor is configured to control the transceiver to perform the periodic uplink transmission on a suitable cell. At least one processor is configured to select other suitable cell, based on a periodicity of the periodic uplink transmission. At least one processor is configured to control the transceiver to perform the periodic uplink transmission on the selected suitable cell.

The present disclosure can have various advantageous effects.

According to some embodiments of the present disclosure, a wireless device could perform inter-RAT cell selection while in camping on a suitable NB-IOT cell.

For example, a wireless device camped on an NB-IoT cell could reselect a better cell when the UE has higher priority RAT/frequency.

For other example, according to the present disclosure, it could be prevented that a UE, which is normally camped on a cell in NB-IoT, has to stay in the cell even though a better cell with higher RAT/frequency priority exists nearby.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
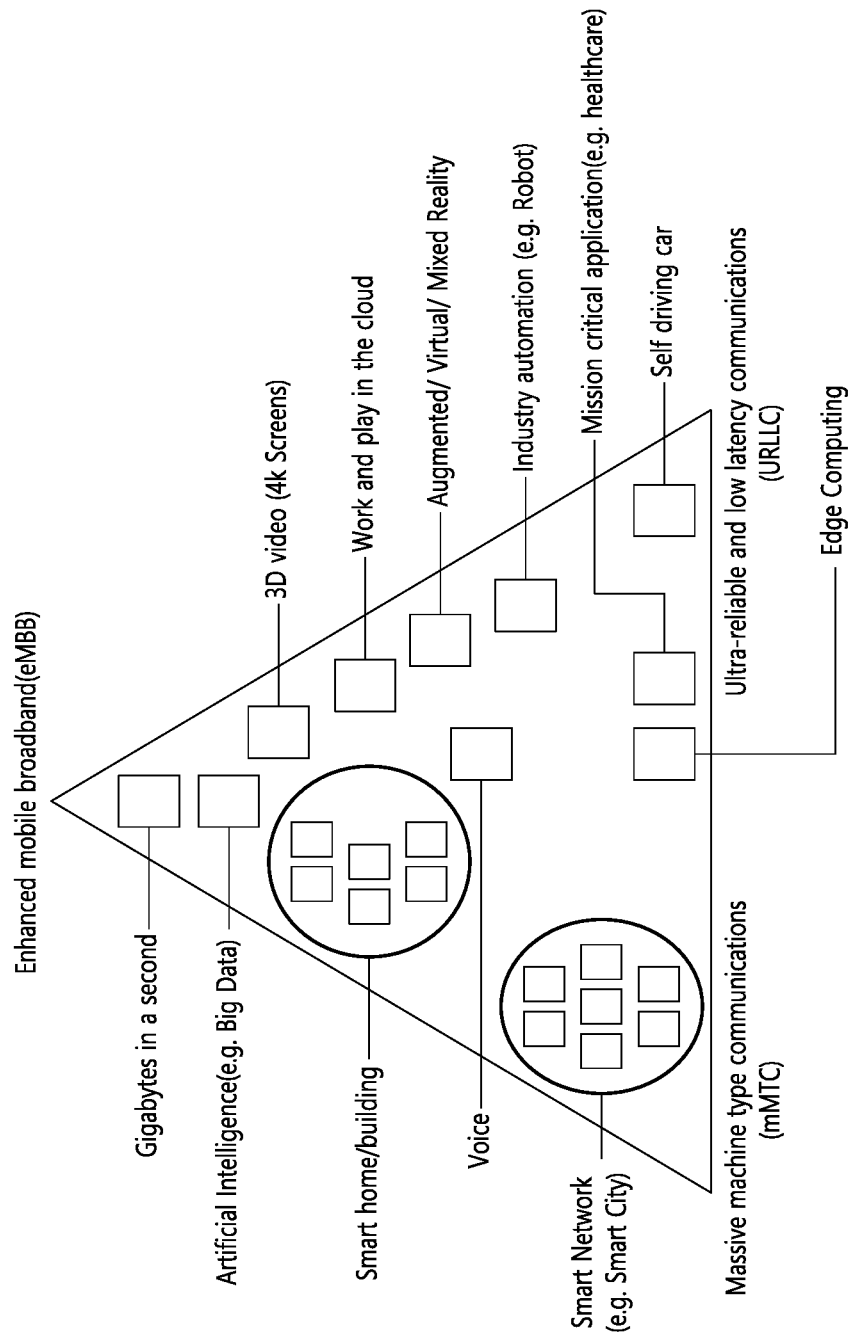
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
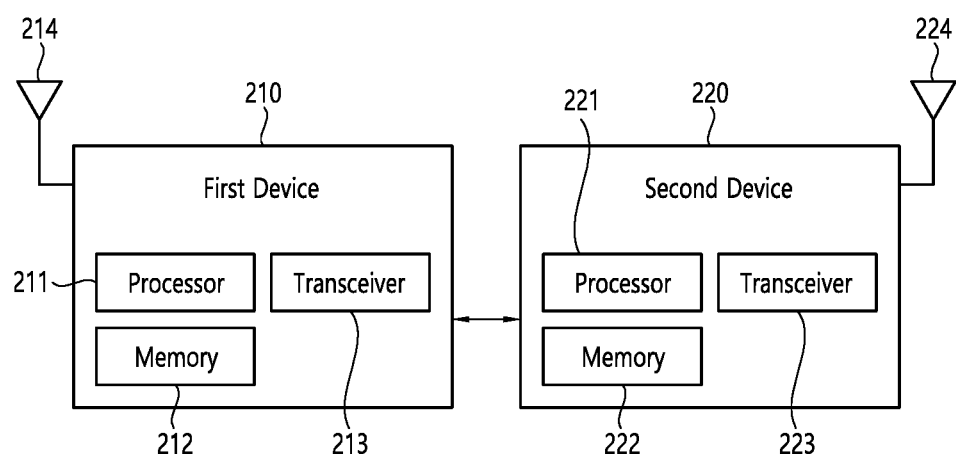
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
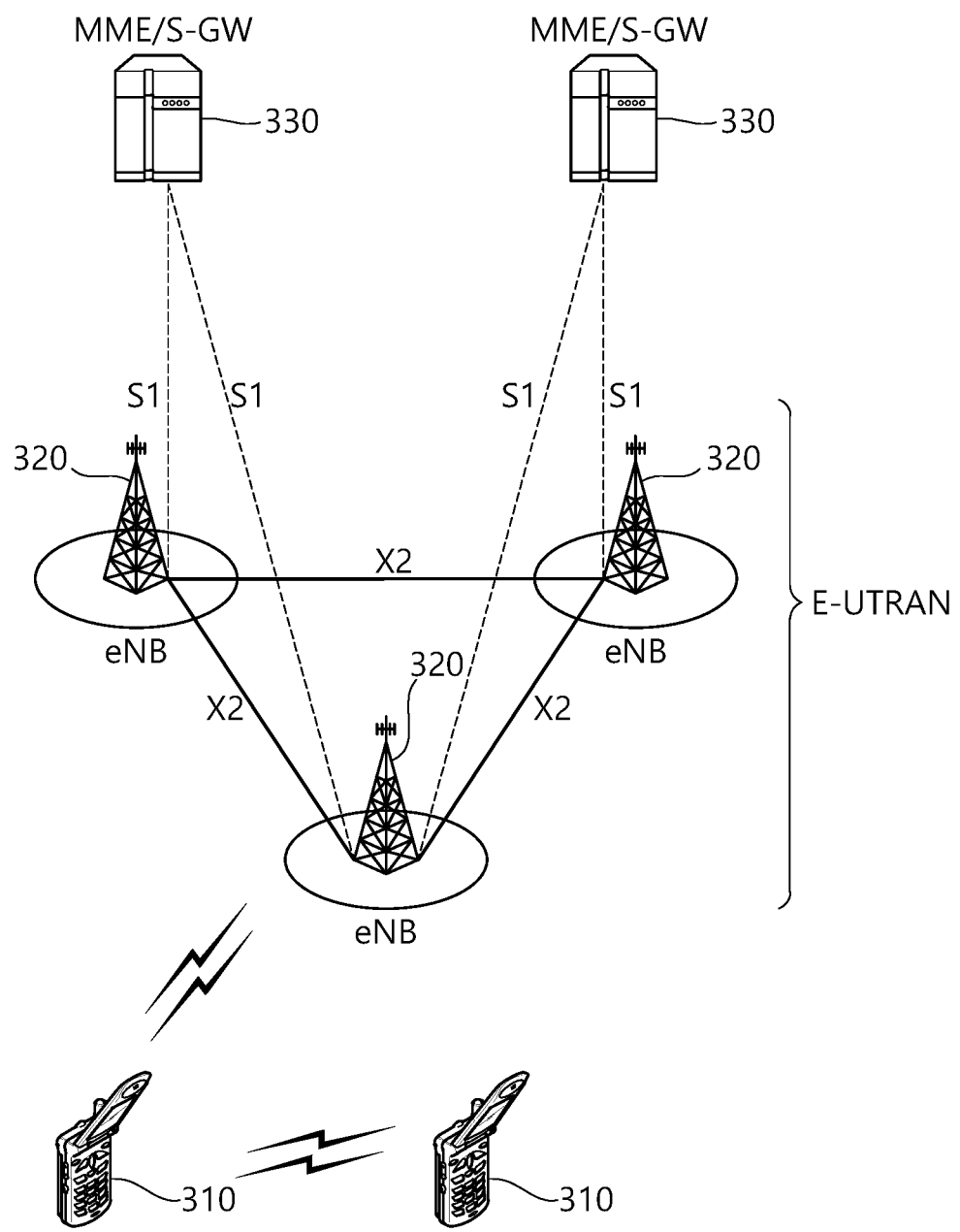
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
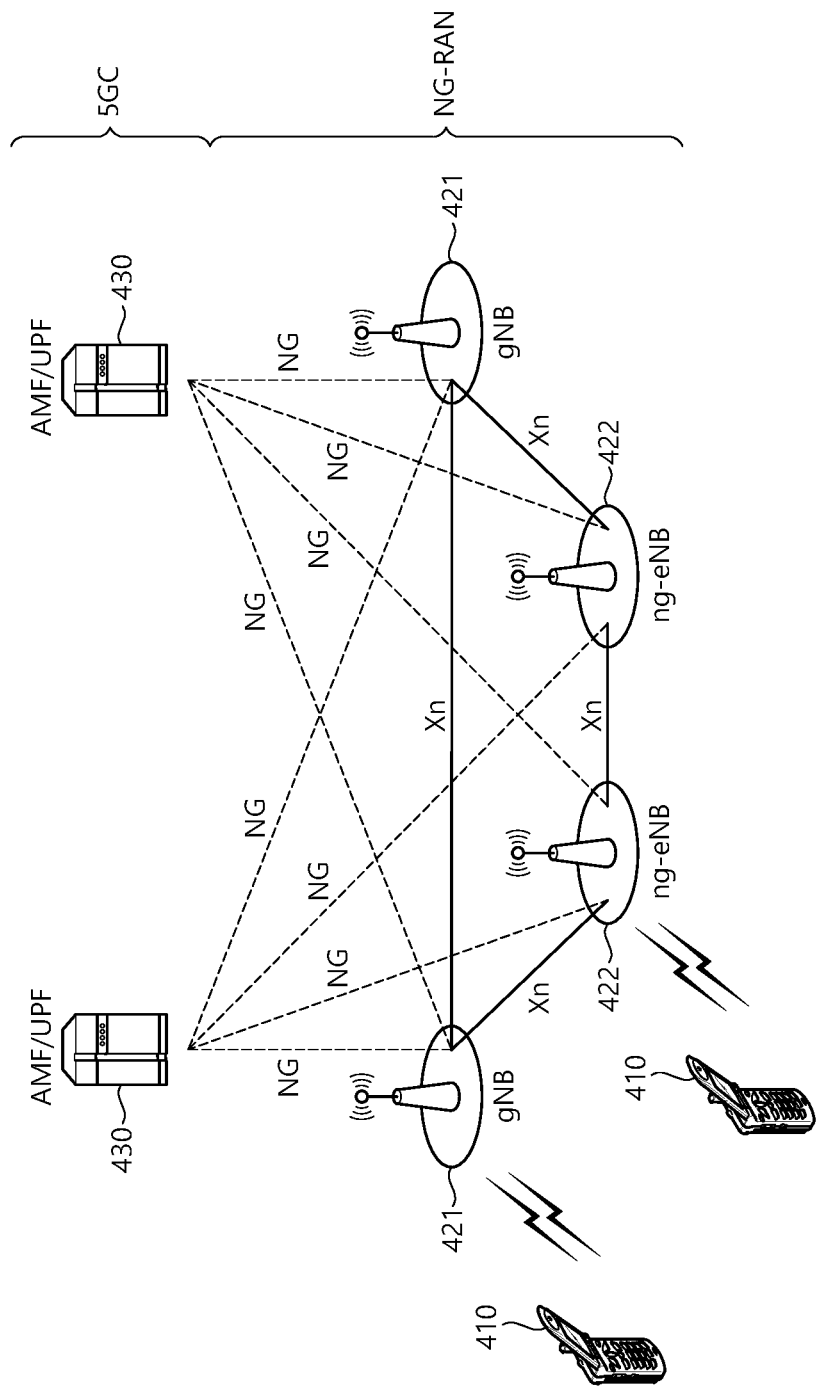
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional 5-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
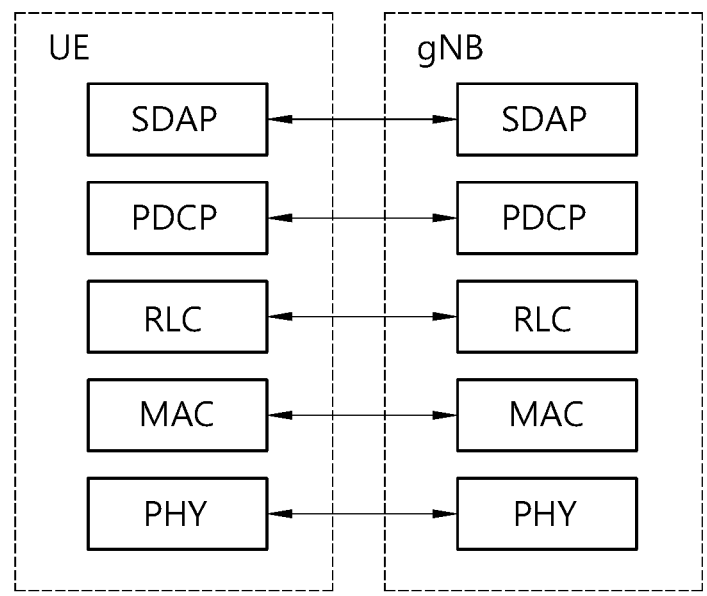
FIG. 5 shows a block diagram of a user plane protocol stack to which the technical features of the present disclosure can be applied.
Figure 6:
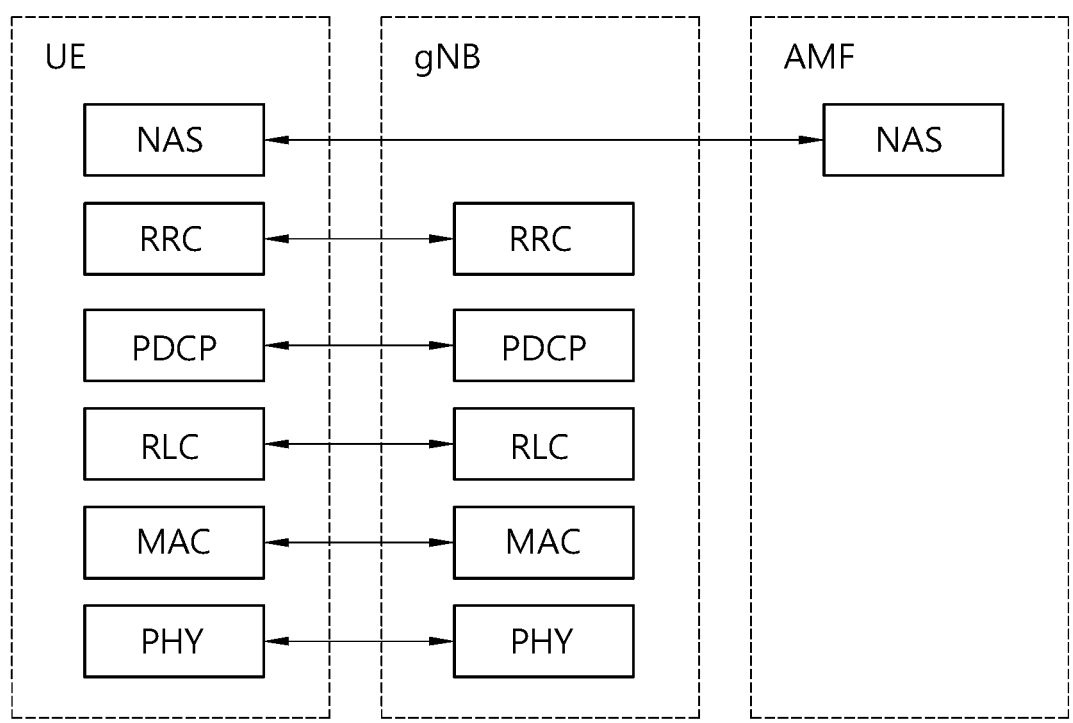
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH)

used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, PLMN Selection will be described. It may be referred to as Sections 5.1.2 of 3GPP TS 36.304 v15.2.0 (2018 December).

On request of the NAS the AS shall perform a search for available PLMNs and report them to NAS.

The UE shall scan all RF channels in the E-UTRA bands according to its capabilities to find available PLMNs. On each carrier, the UE shall search for the strongest cell and read its system information, in order to find out which PLMN(s) the cell belongs to. If the UE can read one or several PLMN identities in the strongest cell, each found PLMN shall be reported to the NAS as a high quality PLMN (but without the RSRP value), provided that the following high quality criterion is fulfilled:

For an E-UTRAN and NB-IoT cell, the measured RSRP value shall be greater than or equal to −110 dBm.

Found PLMNs that do not satisfy the high quality criterion, but for which the UE has been able to read the PLMN identities are reported to the NAS together with the RSRP value. The quality measure reported by the UE to NAS shall be the same for each PLMN found in one cell.

For each found PLMN, if the UE supports E-UTRA connected to 5GC, the associated CN type(s) shall also be reported to the NAS.

If the cell is barred for connectivity to EPC (as indicated by the cellBarred/cellBarred-CRS flag being set to the value barred) a UE supporting E-UTRA connected to 5GC shall only report the available 5GC PLMNs to NAS.

The search for PLMNs may be stopped on request of the NAS. The UE may optimise PLMN search by using stored information e.g. carrier frequencies and optionally also information on cell parameters from previously received measurement control information elements.

Once the UE has selected a PLMN, the cell selection procedure shall be performed in order to select a suitable cell of that PLMN to camp on.

If a CSG ID is provided by NAS as part of PLMN selection, the UE shall search for an acceptable or suitable cell belonging to the provided CSG ID to camp on. When the UE is no longer camped on a cell with the provided CSG ID, AS shall inform NAS.

Hereinafter, NB-IoT functionality in Idle Mode will be described. It may be referred to as Sections 4.4 of 3GPP TS 36.304 v15.2.0 (2018-12).

This specification is applicable to NB-IoT, except for the following functionality which is not applicable to NB-IoT:

Acceptable cell

Accessibility measurements

Access Control based on ACDC categories

Camped on Any cell state

Camping on E-UTRA connected to 5GC

CSG, including support for manual CSG selection and CSG or Hybrid cell related functionality in PLMN selection, or HNB name (SIBS), Cell selection and Cell reselection.

Emergency call

E-UTRAN Inter-frequency Redistribution procedure

Inter-RAT Cell Selection and Reselection including measurements in other RATs

Logged measurements

Mobility History Information

Mobility states of a UE

Priority based reselection

Public warning system including CMAS, ETWS, PWS.

RAN-assisted WLAN interworking

RRC_INACTIVE state

Sidelink operation

Hereinafter, cell selection will be described. It may be referred to as Sections 5.2 of 3GPP TS 36.304 v15.2.0 (2018-12).

UE shall perform measurements for cell selection and reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on idle mode measurements and cell selection criteria.

In order to speed up the cell selection process, stored information for several RATs may be available in the UE.

When camped on a cell, the UE shall regularly search for a better cell according to the cell reselection criteria. If a better cell is found, that cell is selected. The change of cell may imply a change of RAT, or if the current and selected cell are both E-UTRA cells, a change of the CN type.

The NAS is informed if the cell selection and reselection results in changes in the received system information relevant for NAS.

For normal service, the UE shall camp on a suitable cell, tune to that cell's control channel(s) so that the UE can:
Receive system information from the PLMN; and
receive registration area information from the PLMN, e.g., tracking area information; and
receive other AS and NAS Information; and
if registered:
receive paging and notification messages from the PLMN; and
initiate transfer to connected mode.
Cell Selection process will be described.
The UE shall use one of the following two cell selection procedures:

a) Initial Cell Selection

This procedure requires no prior knowledge of which RF channels are E-UTRA or NB-IoT carriers. The UE shall scan all RF channels in the E-UTRA bands according to its capabilities to find a suitable cell. On each carrier frequency, the UE needs only search for the strongest cell. Once a suitable cell is found this cell shall be selected.

b) Stored Information Cell Selection

This procedure requires stored information of carrier frequencies and optionally also information on cell parameters, from previously received measurement control information elements or from previously detected cells. Once the UE has found a suitable cell the UE shall select it. If no suitable cell is found the Initial Cell Selection procedure shall be started.

Priorities between different frequencies or RATs provided to the UE by system information or dedicated signalling are not used in the cell selection process.

If BL UE, UE in enhanced coverage or NB-IoT UE has been provisioned with EARFCN, the UE may use this information during Initial Cell Selection and Stored Information Cell Selection to find a suitable cell.

The cell selection criterion S is fulfilled when:
Srxlev>0 AND Squal>0
Where:
Srxlev=$Q_{rxlevmeas}$−$Q_{rxlevmin}$−Pcompensation−$Qoffset_{temp}$
Squal=$Q_{qualmeas}$−$Q_{qualmin}$−$Qoffset_{temp}$

TABLE 3

| | |
|---|---|
| Srxlev | Cell selection RX level value (dB) |
| Squal | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) If UE is not authorized for enhanced coverage and $Qoffset_{authorization}$ is Valid then $Q_{rxlevmin} = Q_{rxlevmin} + Qoffset_{authorization}$. |
| $Q_{qualmin}$ | Minimum required quality level in the cell (dB) |
| Pcompensation | If the UE supports the additionalPmax in the NS-PmaxList-NB, if present, in SIB1-NB, SIB3-NB and SIB5-NB: max($P_{EMAX1}$ −$P_{PowerClass}$, 0) − (min($P_{EMAX2}$, $P_{PowerClass}$) − min($P_{EMAX1}$, $P_{PowerClass}$)) (dB); else: if $P_{PowerClass}$ is 14 dBm: max($P_{EMAX1}$ − ($P_{PowerClass}$ − Poffset), 0) (dB); else: max($P_{EMAX1}$ − $P_{PowerClass}$, 0) (dB) |
| $P_{EMAX1}$, $P_{EMAX2}$ | Maximum TX power level an UE may use when transmitting on the uplink in the cell (dBm). $P_{EMAX1}$ and $P_{EMAX2}$ are obtained from the p-Max and the NS-PmaxList-NB respectively in SIB1-NB, SIB3-NB and SIB5-NB. |
| $P_{PowerClass}$ | Maximum RF output power of the UE (dBm) according to the UE power class |

Meanwhile, in NB-IoT, one of the important aspect is limited mobility functionalities to support power efficient mechanism. The power efficient mechanism may assist idle mode inter-RAT cell selection for NB-IoT to LTE/LTE-MTC and/or GERAN. The power efficient mechanism may assist idle mode inter-RAT cell selection to NB-IoT to LTE/LTE-MTC and/or GERAN.

IoT devices such as NB-IoT UEs and/or MTC UEs may operate based on service specific requirements to provide a certain level of quality of service. The service may be related to radio access technology. That is, IoT devices may have service specific RAT priority. For example, the LTE-MTC RAT may be the highest priority for some devices, while the NB-IOT RAT may be the highest for other devices. In addition, frequency priorities may need to be considered so that the operator efficiently allocates the resource to the devices.

For NB-IoT, however, priority based reselection and inter-RAT cell reselection functionalities are not supported while inter-RAT cell selection between NB-IoT and LTE/LTE-MTC/GERAN is supported. As a consequence, if a device configured with LTE-MTC as the highest priority RAT is camping on an NB-IOT cell, the device could not search an LTE-MTC RAT, even though a good LTE-MTC cell exists nearby.

Therefore, studies for a wireless device camping on an NB-IOT cell to select a cell with higher RAT/frequency will be required.

Hereinafter, a method and apparatus for inter-RAT cell selection mechanism in NB-IOT, according to some embodiments of the present disclosure, will be described with reference to the following drawings. Herein, a wireless device may be referred to as a user equipment (UE).

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
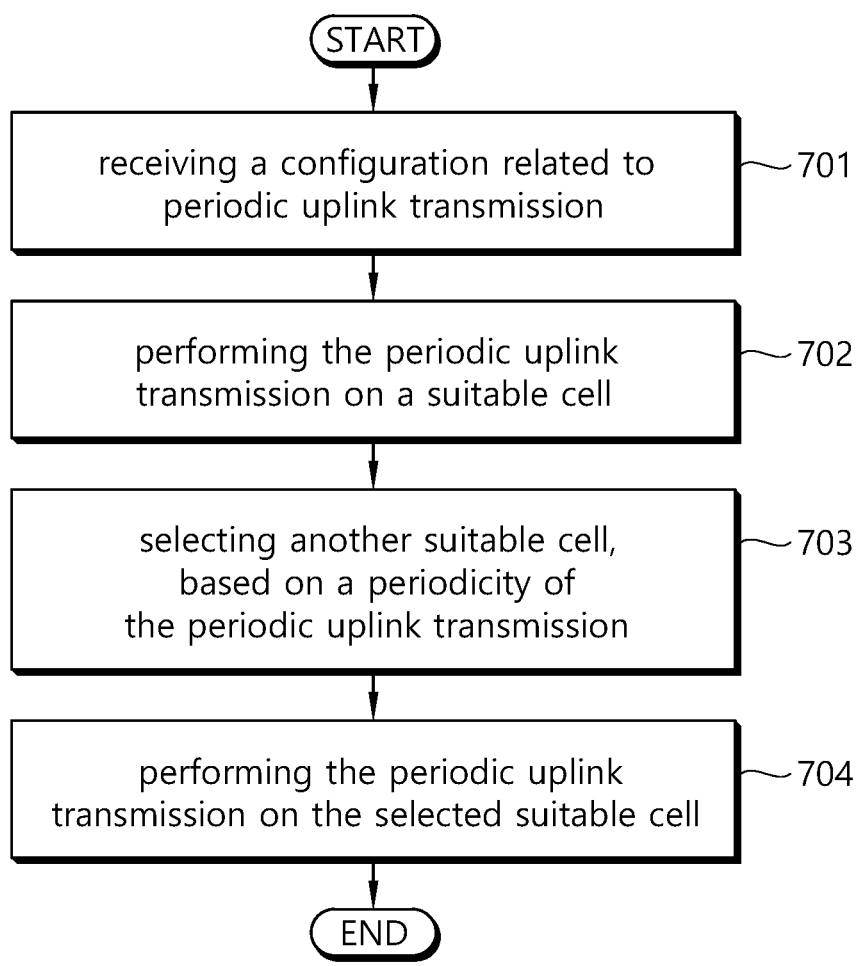
FIG. 7 shows an example of a method for inter-RAT cell selection mechanism in NB-IOT, according to some embodiments of the present disclosure.

FIG. 7 shows an example of a method for inter-RAT cell selection mechanism in NB-IOT, according to some embodiments of the present disclosure.

In step 701, a wireless device may receive a configuration related to periodic uplink transmission. For example, a wireless device may receive the configuration from the network.

According to some embodiments of the present disclosure, a wireless device may store information of RAT and/or frequency priority. For example, a wireless device may store information of RAT and/or frequency priority while in a connected state with a network.

In step 702, a wireless device may perform the periodic uplink transmission on a suitable cell. For example, a wireless device may perform the periodic uplink transmission based on a resource configured by the received configuration. For example, a wireless device may perform the periodic uplink transmission in an idle state.

According to some embodiments of the present disclosure, the suitable cell may be a narrowband internet-of-things (NB-IoT) cell.

In step 703, a wireless device may select other suitable cell, based on a periodicity of the periodic uplink transmission. For example, the other suitable cell may be different from the suitable cell in step 701. For example, a wireless device may select the other suitable cell based on the stored information of RAT and/or frequency priority.

For example, the other suitable cell is selected based on priority of radio access technology (RAT) of the other cell.

For example, the other suitable cell is selected based on priority of frequency of the other cell.

According to some embodiments of the present disclosure, the other suitable cell may be a cell with RAT other than NB-IoT. For example, the other suitable cell may be an MTC cell.

According to some embodiments of the present disclosure, a wireless device may configure a periodic search timer based on the periodicity of the periodic uplink transmission. For example, a periodicity of the periodic search timer may be n times of the periodicity of the periodic uplink transmission, wherein n is a natural number. For example, the periodic search timer may start a duration for prohibiting cell selection before the periodic uplink transmission is performed.

According to some embodiments of the present disclosure, the periodic search timer may start as receiving a configuration of the periodic uplink transmission.

According to some embodiments of the present disclosure, the periodic search timer may start as leaving a connected mode with a network. For example, a wireless device may start the periodic search timer upon entering an idle state.

For example, a wireless device may trigger cell selection for other suitable cell, upon expiry of the periodic search timer. That is the selecting other suitable cell may be triggered upon expiry of the periodic search timer.

For other example, the selecting other suitable cell may include performing a PLMN selection upon expiry of the periodic search timer. That is, upon expiry of the periodic search timer, a wireless device may perform a PLMN selection procedure. A wireless device may select other suitable cell based on RAT and/or frequency priority after the PLMN selection.

For other example, the selecting other suitable cell may include performing any cell selection upon expiry of the periodic search timer. That is, upon expiry of the periodic search timer, a wireless device may perform an Any cell selection procedure. A wireless device may select other suitable cell based on RAT and/or frequency priority after Any cell selection procedure.

In step 704, a wireless device may perform the periodic uplink transmission on the selected suitable cell. For example, a wireless device may perform the periodic uplink transmission on the selected suitable cell based on a resource configured by the received configuration. For example, a wireless device may perform the periodic uplink transmission in an idle state.

According to some embodiments of the present disclosure, the wireless device is in communication with at least one of user equipment, a network, or an autonomous vehicle other than the wireless device.

Hereinafter, some embodiments for inter-RAT cell selection mechanism in NB-IOT, according to the present disclosure, will be described.

According to some embodiments of the present disclosure, a UE normally camped on an NB-IoT cell may perform either PLMN selection or cell selection without involving NAS PLMN selection to search for a cell in higher priority RAT and/or frequency.

The UE may perform the selection procedure at regular time intervals whose value is related to a service-specific traffic patterns. The service-specific traffic patterns may be preconfigured in a UE or configured via dedicated or broadcast signalling.

A UE may maintain the following parameters, such as $T_{service\_interval}$ and $T_{periodic\_search}$.

A timer, noted as $T_{service\_interval}$, is an interval time of periodic communication (e.g. Communication patterns parameter). For example, a UE may send data to the network every hour where $T_{service\_interval}$ is an hour. A value of $T_{service\_interval}$ may be preconfigured in the UE or configured via dedicated or broadcast signalling A timer, noted as $T_{periodic\_search}$, is a timer to search for a cell in higher RAT/frequency priority. The value may be derived from $T_{service\_interval}$. For example, $T_{periodic\_search}=n \times T_{service\_interval} \pm \alpha$, where $n \geq 1$ and $\alpha > 0$. Each value of $T_{periodic\_search}$, n and $\alpha$ could be preconfigured in the UE or configured via dedicated or broadcast signalling provided from the network. For other example, $T_{periodic\_search}=n \times T_{service\_interval}$, where $n \geq 1$. Each value of $T_{periodic\_search}$ and n could be preconfigured in the UE or configured via dedicated or broadcast signalling provided from the network. For example, $\alpha$ may be referred to as a duration for prohibiting cell selection, as described in FIG. 12.

According to some embodiments of the present disclosure, a UE may send data to the network at $k \times T_{service\_interval}$, wherein the k is a natural number (for example, k=1, 2, 3, . . . ). A UE may perform priority based cell selection $l \times (k \times T_{service\_interval}) + \alpha$, wherein the l is a natural number and $\alpha > 0$, (for example, l=1, 2, 3 . . . ). In this case, the $T_{periodic\_search}=(k \times T_{service\_interval})$. For example, $\alpha$ may be referred to as a duration for prohibiting cell selection, as described in FIG. 12.

When a UE is camped on an NB-IoT cell and the UE has higher priority RAT/frequency information, the UE may perform priority based cell selection using PLMN selection.

Figure 8:
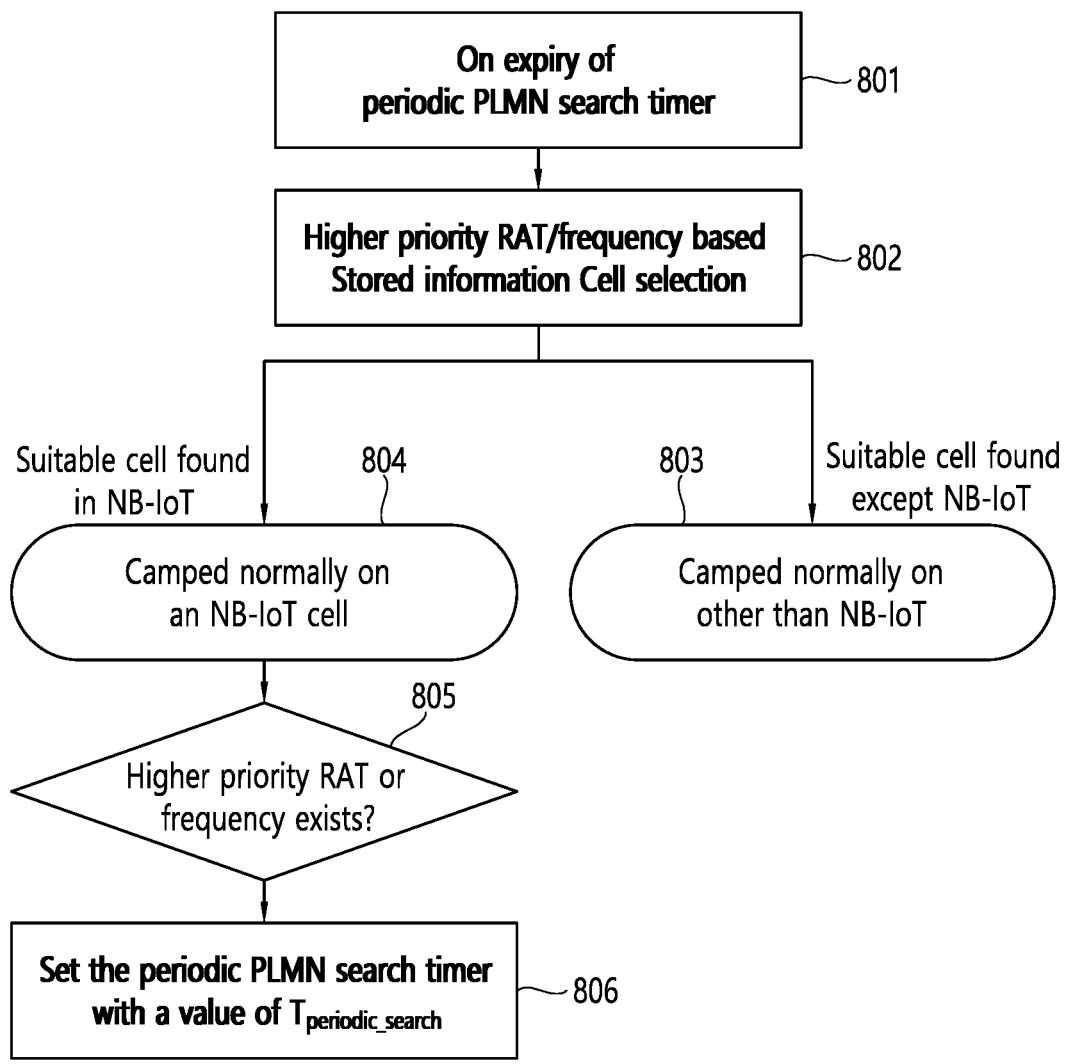
FIG. 8 shows an example of a method for priority based cell selection using PLMN selection.

FIG. 8 shows an example of a method for priority based cell selection using PLMN selection. In FIG. 8, a UE may perform priority based cell selection using PLMN selection while the UE is camped on an NB-IoT cell and the UE has higher priority RAT and/or frequency information.

In step 801, a UE may configure a periodic PLMN search timer. When the periodic PLMN search timer is expired, a UE may perform priority based cell selection.

A UE may configure a value of a periodic PLMN search timer (for example, the periodic PLMN search timer may be referred to as $T_{periodic\_search}$). For example, a UE may configure $T_{periodic\_search}$ by itself. For other example, a UE may receive, from a network, information for $T_{periodic\_search}$ via dedicated or broadcast signalling.

RRC of a UE may indicate the value of $T_{periodic\_search}$ to NAS of the UE. The UE may configure its periodic PLMN search timer with the value of $T_{periodic\_search}$. The UE may perform PLMN search procedure based on the periodic PLMN search timer.

In step 802, upon expiry of the periodic PLMN search timer ($T_{periodic\_search}$), the UE performing PLMN search procedure may eventually perform cell selection based on the stored information including RAT and/or frequency priority. The UE may search for a suitable cell with higher RAT and/or frequency.

According to some embodiments of the present disclosure, during the cell selection based on the stored information, the UE may firstly search a cell in the highest RAT which fulfils cell selection criteria. If priorities for the associated frequencies are also valid, the UE may also search a cell in the frequency priorities in the associated RAT.

In step 803, if a suitable cell is found except NB-IoT, the UE may normally camp on the suitable cell other than NB-IoT.

In other words, if a UE finds a suitable cell which has a higher priority than an NB-IoT cell based on the stored information, the UE may camp on the suitable cell with a higher priority.

In step 804, if a suitable cell is found in NB-IoT, a UE may camp normally on an NB-IoT cell.

In step 805, a UE may check whether a higher priority RAT or frequency than the NB-IoT cell exists or not.

If there is a higher priority RAT or frequency than the NB-IoT cell, a UE may store the information of a higher priority RAT or frequency.

In step 806, a UE may set the periodic PLMN search timer with a value of $T_{periodic\_search}$.

Figure 9:
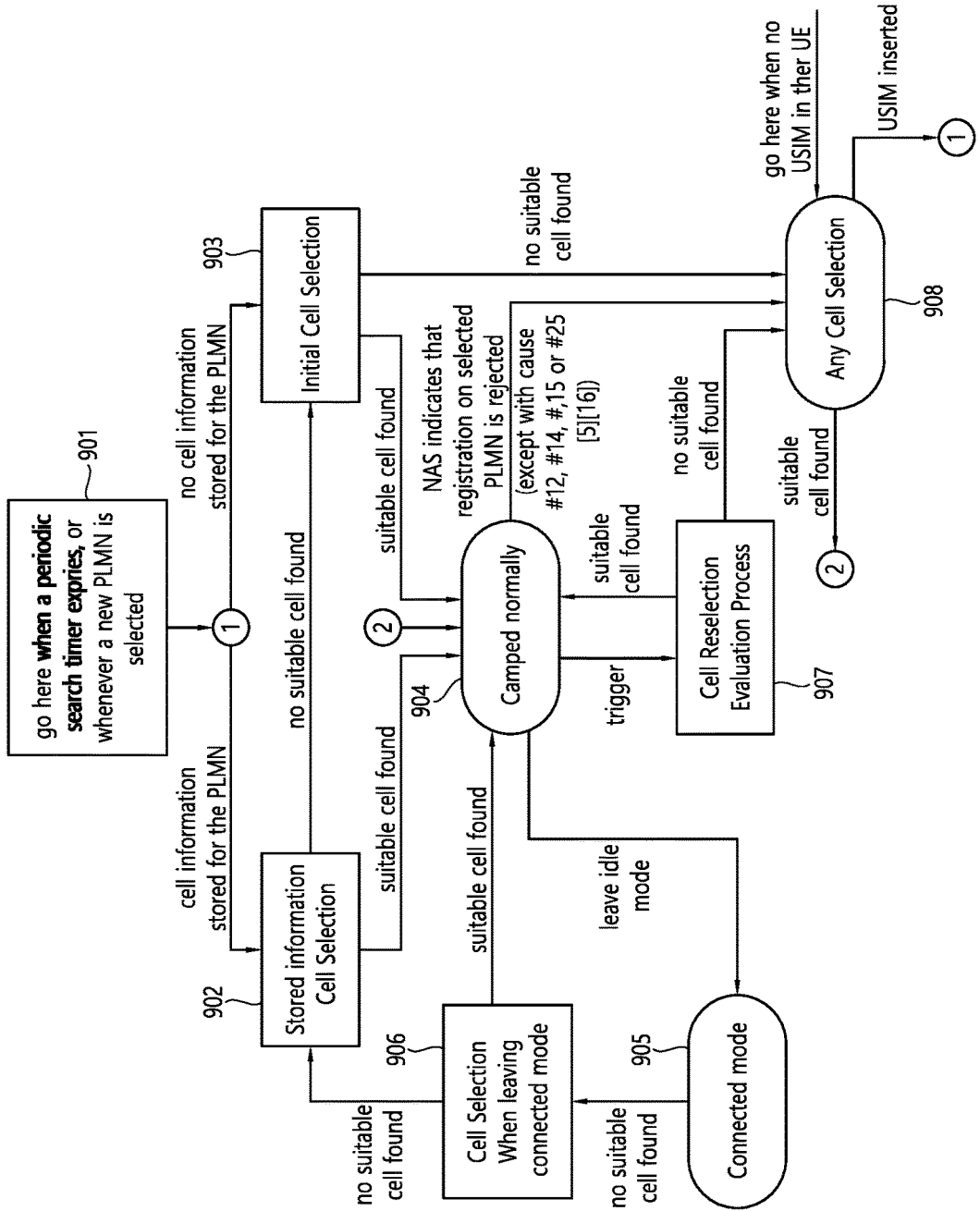
FIG. 9 shows a flow chart of an example of a method for priority based cell selection using PLMN selection.

FIG. 9 shows a flow chart of an example of a method for priority based cell selection using PLMN selection. The description of the same parts as those described above will be simplified or omitted.

In step 901, a wireless device may trigger cell selection. For example, when a periodic search timer expires, a wireless device may trigger cell selection. For other example, whenever a new PLMN is selected, a wireless device may trigger cell selection. For another example, when a USIM is inserted in step 908 below, a wireless device may trigger cell selection.

According to some embodiments of the present disclosure, a wireless device may configure a periodic PLMN search timer (for example, the periodic PLMN search timer may be referred to as $T_{periodic\_search}$) based on an interval time of periodic communication (for example, $T_{service\_interval}$). The interval time of periodic communication, such as a periodicity of the periodic communication, may be transmitted from a network or configured by the wireless device.

In step 902, a wireless device may perform cell selection based on the stored information. For example, if a wireless device stores cell information for the PLMN, a wireless device may perform cell selection based on the stored information. For other example, if no suitable cell is found in step 906, a wireless device may perform cell selection based on the stored information.

In step 903, a wireless device may perform initial cell selection. For example, if a wireless device does not store cell information for the PLMN, a wireless device may perform initial cell selection. For other example, if no suitable cell is found in step 902, a wireless device may perform initial cell selection.

In step 904, a wireless device may normally camp on a suitable cell. For example, if a suitable cell is found from step 902, a wireless device may camp on the suitable cell. For other example, if a suitable cell is found from step 903, a wireless device may camp on the suitable cell. For another example, if a suitable cell is found from step 906, a wireless device may camp on the suitable cell. For another example, if a suitable cell is found in step 907, a wireless device may camp on the suitable cell. For another example, if a suitable cell is found in step 908, a wireless device may camp on the suitable cell.

In step 905, a wireless device may be on connected mode with a network. For example, if a wireless device leaves an idle mode with a network, the wireless device may establish an RRC connection with the suitable cell, on which the wireless device camps in step 904.

In step 906, a wireless device may perform cell selection when leaving connected mode. For example, when a wireless device returns to idle mode, the wireless device may perform cell selection.

In step 907, a wireless device may perform a cell reselection evaluation process. For example, when the cell reselection evaluation process is triggered for a wireless device camping on a suitable cell, the wireless device may perform a cell reselection evaluation process for the suitable cell.

In step 908, a wireless device may perform any cell selection. For example, if no suitable cell is found from step 903, a wireless device may perform any cell selection. For other example, if no suitable cell is found from step 907, a wireless device may perform any cell selection. For another example, if there is no USIM in the wireless device (for example, UE), a wireless device may perform any cell selection. For another example, if NAS of the wireless device indicates that registration on selected PLMN is rejected, the wireless device may perform any cell selection.

Figure 10:
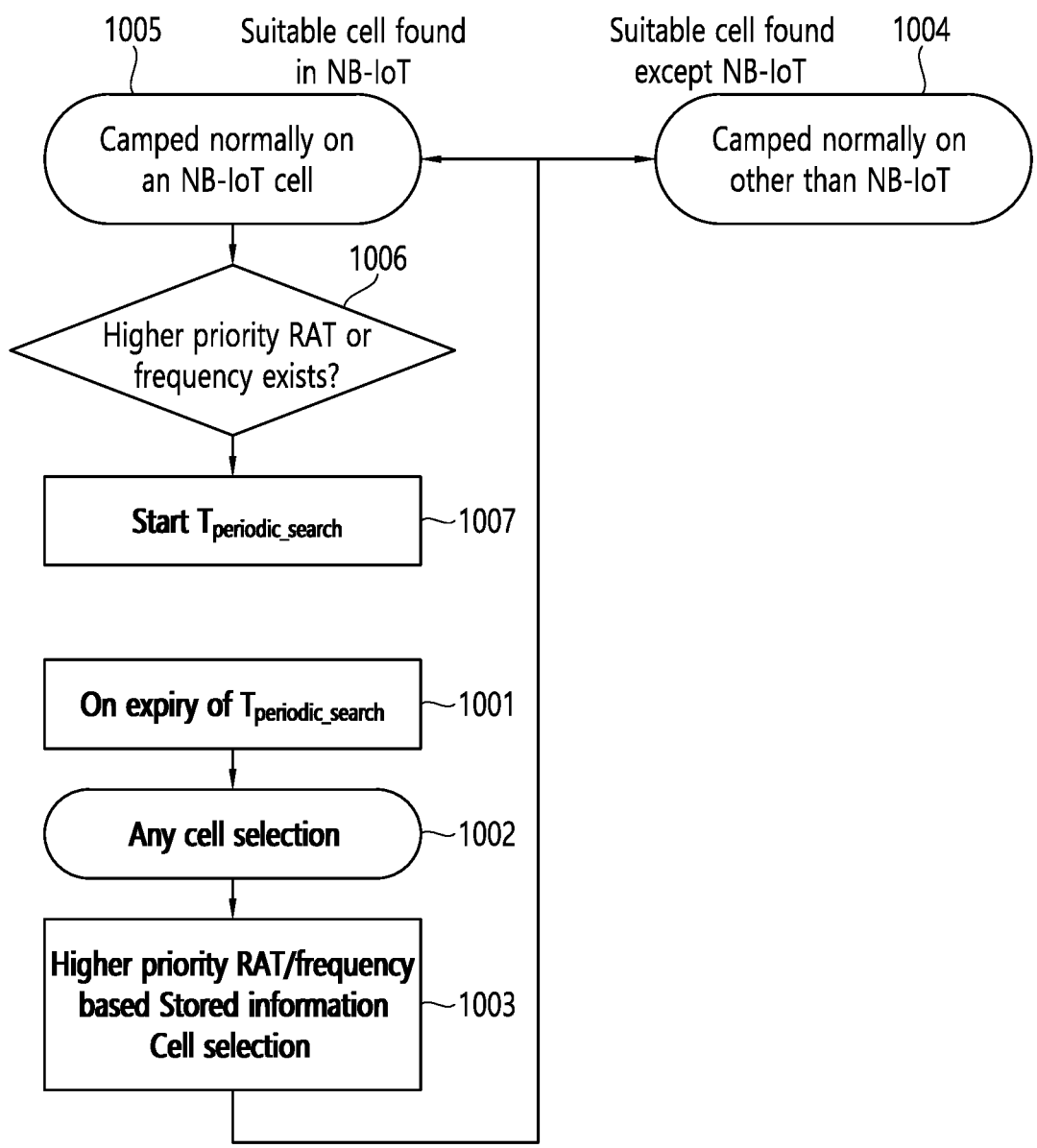
FIG. 10 shows an example of a method for priority based cell selection without involving PLMN selection.

FIG. 10 shows an example of a method for priority based cell selection without involving PLMN selection. In FIG. 10, a UE may perform priority based cell selection without involving PLMN selection while the UE is camped on an NB-IoT cell and the UE has higher priority RAT and/or frequency information. The description of the same parts as those described above will be simplified or omitted.

In step 1001, a UE may configure a periodic search timer. When the periodic search timer is expired, a UE may trigger any cell selection.

A UE may configure a value of a periodic search timer (for example, a periodic search timer is referred to as $T_{periodic\_search}$). For example, a UE may configure $T_{periodic\_search}$ by itself. For example, a UE may receive, from a network, information for $T_{periodic\_search}$ via dedicated or broadcast signalling.

In step 1002, upon expiry of $T_{periodic\_search}$, a UE may be on an Any cell selection state although the UE was normally camped on an NB-IoT cell. In other words, a UE may perform Any cell selection procedure, upon the periodic PLMN search timer is expired.

In step 1003, a UE may perform cell selection based on the stored information including RAT and/or frequency priority. The UE may search for a suitable cell with higher RAT and/or frequency.

According to some embodiments of the present disclosure, during the cell selection based on the stored information, the UE may firstly search a cell in the highest RAT which fulfils cell selection criteria. If priorities for the associated frequencies are also valid, the UE may also search a cell in the frequency priorities in the associated RAT.

In step 1004, a UE may camp normally on a suitable cell other than NB-IoT. For example, if a suitable cell is found except NB-IoT, a UE may camp normally on the suitable cell except NB-IoT.

In step 1005, a UE may camp normally on an NB-IoT cell. For example, if a suitable cell is found in NB-IoT, a UE may camp normally on the suitable cell on an NB-IoT.

In step 1006, a UE may check whether a higher priority RAT or frequency than the NB-IoT cell exists or not.

If there is a higher priority RAT or frequency than the NB-IoT cell, a UE may store the information of a higher priority RAT or frequency.

Figure 11:
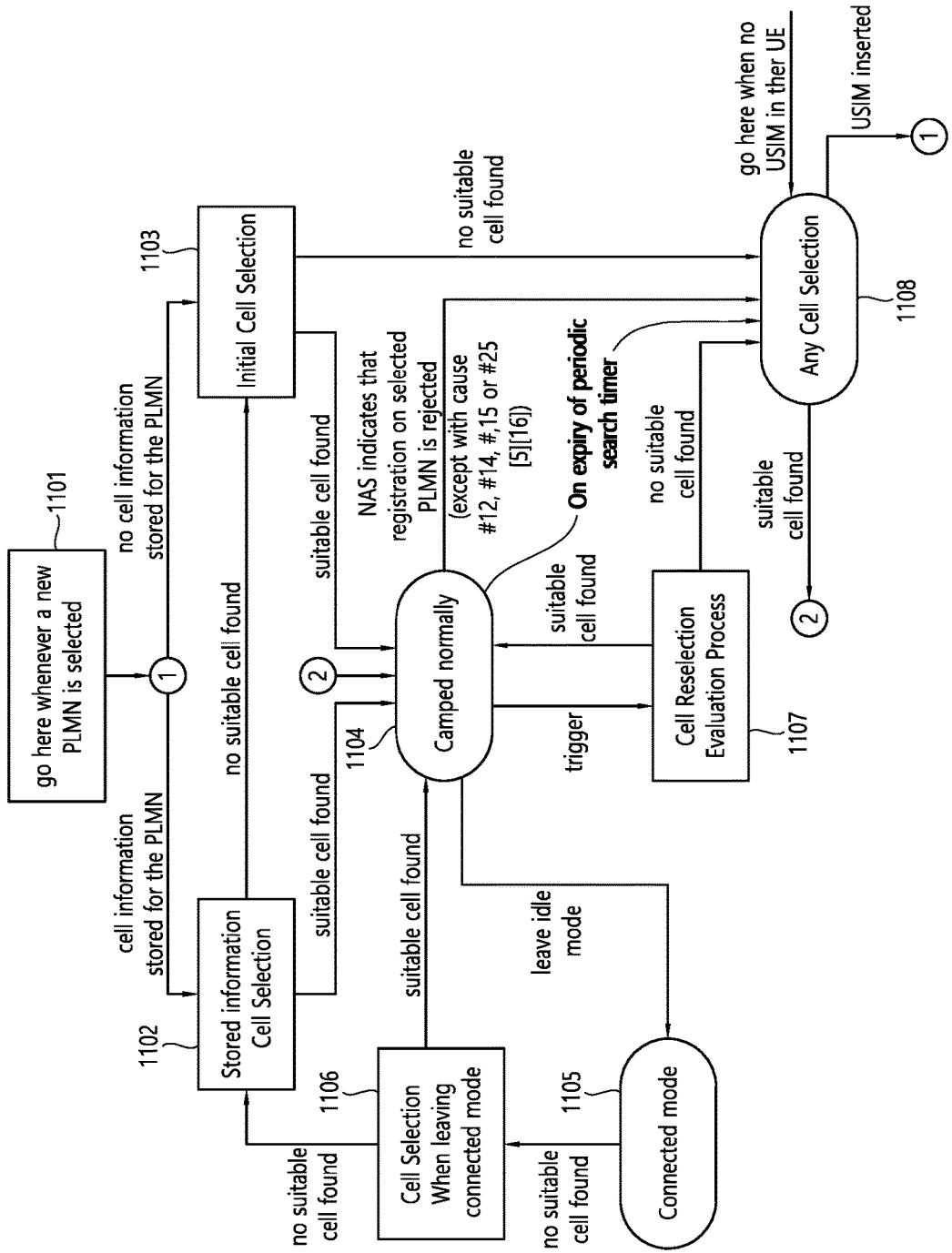
FIG. 11 shows a flow chart of an example of a method for priority based cell selection using PLMN selection.

In step 1007, a UE may start the periodic search timer with a value of $T_{periodic\_search}$. FIG. 11 shows a flow chart of an example of a method for priority based cell selection using PLMN selection. The description of the same parts as those described above will be simplified or omitted. The description of the same parts as those described above will be simplified or omitted.

In step 1101, a wireless device may trigger cell selection. For example, whenever a new PLMN is selected, a wireless device may trigger cell selection. For other example, when a USIM is inserted in step 1108 below, a wireless device may trigger cell selection.

In step 1102, a wireless device may perform cell selection based on the stored information. For example, if a wireless device stores cell information for the PLMN, a wireless device may perform cell selection based on the stored information. For other example, if no suitable cell is found in step 1106, a wireless device may perform cell selection based on the stored information.

In step 1103, a wireless device may perform initial cell selection. For example, if a wireless device does not store cell information for the PLMN, a wireless device may perform initial cell selection. For other example, if no suitable cell is found in step 1102, a wireless device may perform initial cell selection.

In step 1104, a wireless device may normally camp on a suitable cell. For example, if a suitable cell is found from steps 1102, 1103, 1106, 1107, or 1108, a wireless device may camp on the suitable cell.

In step 1105, a wireless device may be on connected mode with a network. For example, if a wireless device leaves an idle mode with a network, the wireless device may establish an RRC connection with the suitable cell, on which the wireless device camps in step 1104.

In step 1106, a wireless device may perform cell selection when leaving connected mode. For example, when a wireless device returns to idle mode, the wireless device may perform cell selection.

In step 1107, a wireless device may perform a cell reselection evaluation process. For example, when the cell reselection evaluation process is triggered for a wireless device camping on a suitable cell, the wireless device may perform a cell reselection evaluation process for the suitable cell.

In step 1108, a wireless device may perform any cell selection. For example, if no suitable cell is found from step 1103 or 1107, a wireless device may perform any cell selection. For another example, if there is no USIM in the wireless device (for example, UE), a wireless device may perform any cell selection. For another example, if NAS of the wireless device indicates that registration on selected PLMN is rejected, the wireless device may perform any cell selection.

According to some embodiments of the present disclosure, a wireless device may perform any cell selection, if a periodic search timer is expired. For example, a wireless device may configure the periodic search timer (for example, $T_{periodic\_search}$) based on an interval time of periodic communication (for example, $T_{service\_interval}$). The interval time of periodic communication, such as a periodicity of the periodic communication, may be transmitted from a network or configured by the wireless device.

Figure 12:
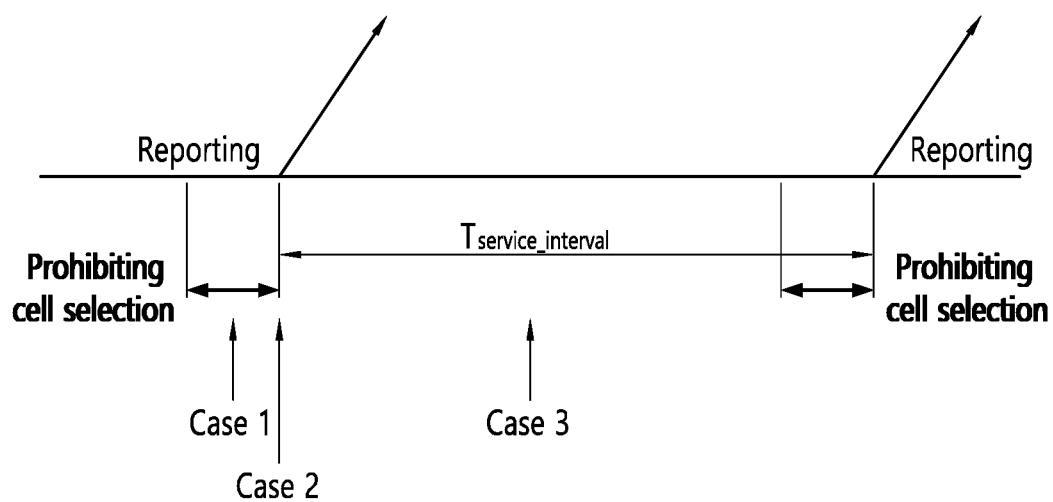
FIG. 12 shows an example of a method for priority based cell selection upon expiry of a periodic search timer, $T_{periodic\_search}$.

FIG. 12 shows an example of a method for priority based cell selection upon expiry of a periodic search timer, $T_{periodic\_search}$. In particular, FIG. 12 shows some cases of proper timing for performing cell selection. The description of the same parts as those described above will be simplified or omitted.

In Case 1, UE may not perform a cell selection procedure to find a higher priority cell. In other words, UE may not perform the cell selection procedure for a duration of prohibiting cell selection. Because of the duration of prohibiting cell selection, UE may perform periodic uplink communication based on scheduled communication pattern. For example, the scheduled communication pattern may be preconfigured in the UE or indicated by the network via RRC/NAS signalling.

The UE may determine the value of the duration of prohibiting cell selection based on service specific communication pattern information. For example, UE may determine the value of the duration of prohibiting cell selection (for example, a) based on an interval time of periodic communication (for example, $T_{service\_interval}$).

In other words, UE may determine a periodic search timer for performing cell selection based on the duration of prohibiting cell selection and the interval time of periodic communication. For example, UE may set periodic timing of cell selection to avoid the duration of prohibiting cell selection. For example, UE may perform the cell selection at $n \times T_{service\_interval} + \alpha$, wherein the duration of prohibiting cell selection is a and an interval time of periodic communication is $T_{service\_interval}$.

In case 2, the UE may or may not perform cell selection procedure right after UL data reporting.

For example, if the UE is expected to receive feedback for UL transmission via PHY/MAC/RRC/NAS signalling, the UE may not perform the cell selection procedure until the procedure to receive the feedback ends.

Otherwise, if the UE is not expected to receive feedback for UL transmission via PHY/MAC/RRC/NAS signalling, the UE could perform the cell selection procedure until the procedure to receive the feedback ends.

In case 3, the UE may perform cell selection procedure. For example, the UE could perform cell selection based on priority of RAT and/or frequency.

According to some embodiments of the present disclosure described with reference to FIGS. 7 to 12, a wireless device could perform inter-RAT cell selection while in camping on a suitable NB-IOT cell.

For example, a wireless device camped on an NB-IoT cell could reselect a better cell when the UE has higher priority RAT/frequency.

For other example, according to the present disclosure, it could be prevented that a UE, which is normally camped on a cell in NB-IoT, has to stay in the cell even though a better cell with higher RAT/frequency priority exists nearby.

Figure 13:
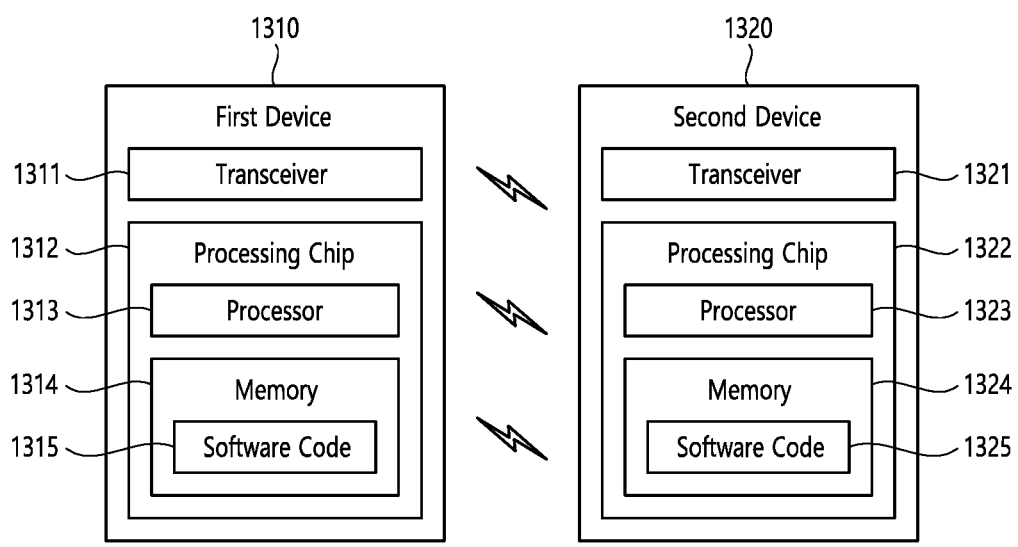
FIG. 13 shows another example of a wireless communication system to which the technical features of the present disclosure can be applied.

FIG. 13 shows another example of a wireless communication system to which the technical features of the present disclosure can be applied.

Referring to FIG. 13, the wireless communication system may include a first device 1310 and a second device 1320.

The first device 1310 may include at least one transceiver, such as a transceiver 1311, and at least one processing chip, such as a processing chip 1312. The processing chip 1312 may include at least one processor, such a processor 1313, and at least one memory, such as a memory 1314. The memory may be operably connectable to the processor 1313. The memory 1314 may store various types of information and/or instructions. The memory 1314 may store a software code 1315 which implements instructions that, when executed by the processor 1313, perform operations of the present disclosure described below. For example, the software code 1315 may implement instructions that, when executed by the processor 1313, perform the functions, procedures, and/or methods of the present disclosure described below. For example, the software code 1315 may control the processor 1313 to perform one or more protocols.

For example, the software code 1315 may control the processor 1313 may perform one or more layers of the radio interface protocol.

The second device 1320 may include at least one transceiver, such as a transceiver 1321, and at least one processing chip, such as a processing chip 1322. The processing chip 1322 may include at least one processor, such a processor 1323, and at least one memory, such as a memory 1324. The memory may be operably connectable to the processor 1323. The memory 1324 may store various types of information and/or instructions. The memory 1324 may store a software code 1325 which implements instructions that, when executed by the processor 1323, perform operations of the present disclosure described below. For example, the software code 1325 may implement instructions that, when executed by the processor 1323, perform the functions, procedures, and/or methods of the present disclosure described below. For example, the software code 1325 may control the processor 1323 to perform one or more protocols. For example, the software code 1325 may control the processor 1323 may perform one or more layers of the radio interface protocol.

According to some embodiment of the present disclosure, the technical features of the present disclosure could be embodied directly in hardware, in a software executed by a processor, or in a combination of the two. For example, a method performed by a first core network node in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device. The stored a plurality of instructions may cause the wireless device to receive a configuration related to periodic uplink transmission. The stored a plurality of instructions may cause the wireless device to perform the periodic uplink transmission on a suitable cell. The stored a plurality of instructions may cause the wireless device to select other suitable cell, based on a periodicity of the periodic uplink transmission. The stored a plurality of instructions may cause the wireless device to perform the periodic uplink transmission on the selected suitable cell.

Figure 14:
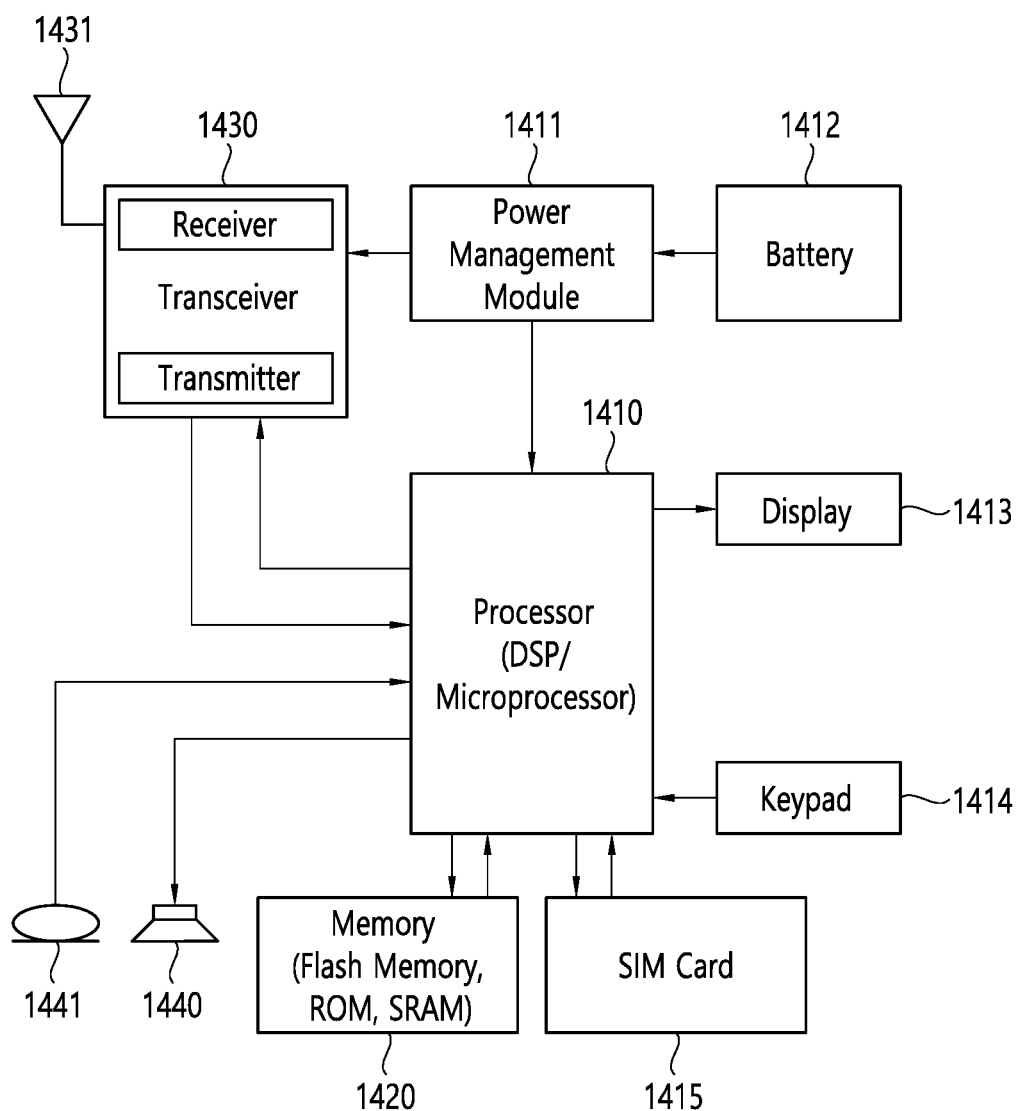
FIG. 14 shows an apparatus to which the technical features of the present disclosure can be applied.

FIG. 14 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1410, a power management module 1411, a battery 1412, a display 1413, a keypad 1414, a subscriber identification module (SIM) card 1415, a memory 1420, a transceiver 1430, one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator). An example of the processor 1410 may be found in SNAPDRAGON™ series of processors made by Qualcomm®, EXYNOSTM™ series of processors made by Samsung®, A series of processors made by Apple®, HELIOTM™ series of processors made by MediaTek®, ATOMTM™ series of processors made by Intel® or a corresponding next generation processor.

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

According to some embodiments of the present disclosure, the processor 1410 may be configured to be coupled operably with the memory 1420 and the transceiver 1430. The processor 1410 may be configured to control the transceiver 1430 to receive a configuration related to periodic uplink transmission. The processor 1410 may be configured to control the transceiver 1430 to perform the periodic uplink transmission on a suitable cell. The processor 1410 may be configured to select other suitable cell, based on a periodicity of the periodic uplink transmission. The processor 1410 may be configured to control the transceiver 1430 to perform the periodic uplink transmission on the selected suitable cell.

According to some embodiments of the present disclosure, a processor may control a wireless device to perform inter-RAT cell selection while in camping on a suitable NB-IOT cell.

For example, a wireless device camped on an NB-IoT cell could reselect a better cell when the UE has higher priority RAT/frequency.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 15:
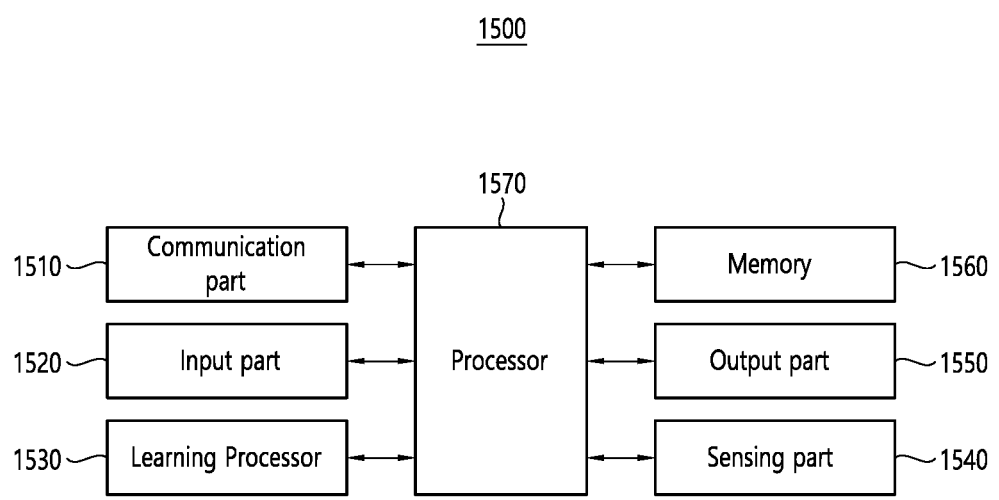
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
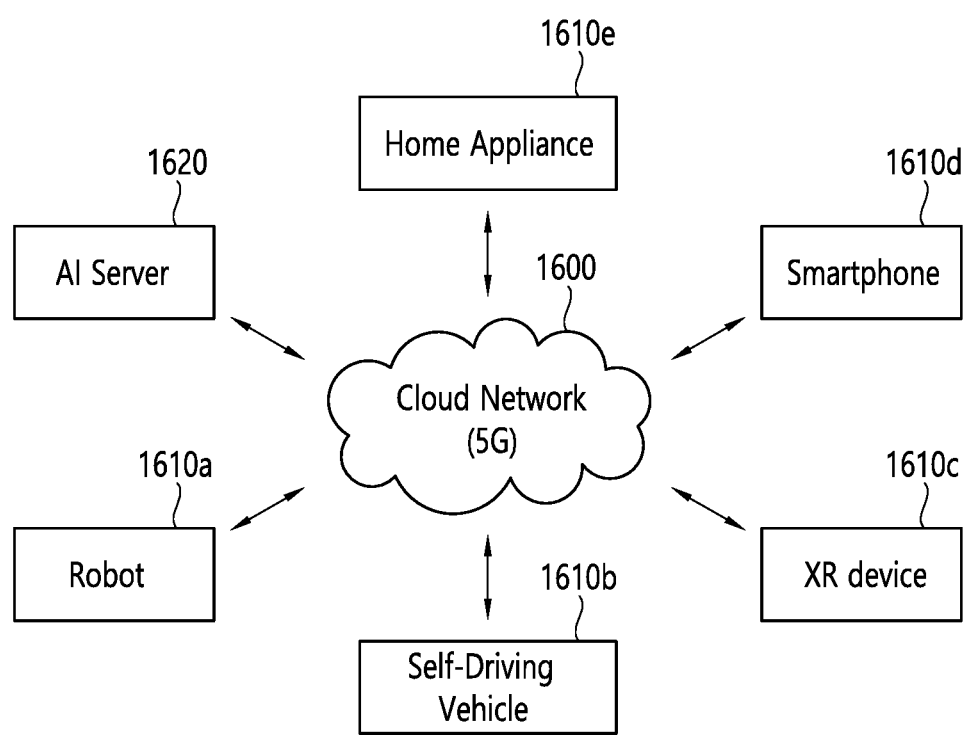
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610*a*, an autonomous vehicle 1610*b*, an XR device 1610*c*, a smartphone 1610*d* and/or a home appliance 1610*e* is connected to a cloud network 1600. The robot 1610*a*, the autonomous vehicle 1610*b*, the XR device 1610*c*, the smartphone 1610*d*, and/or the home appliance 1610*e* to which the AI technology is applied may be referred to as AI devices 1610*a* to 1610*e*.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610*a* to 1610*e* and 1620 consisting the AI system may be connected to each other through the cloud network 1600. In particular, each of the devices 1610*a* to 1610*e* and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610*a*, the autonomous vehicle 1610*b*, the XR device 1610*c*, the smartphone 1610*d* and/or the home appliance 1610*e* through the cloud network 1600, and may assist at least some AI processing of the connected AI devices 1610*a* to 1610*e*. The AI server 1620 can learn the ANN according to the machine learning algorithm on behalf of the AI devices 1610*a* to 1610*e*, and can directly store the learning models and/or transmit them to the AI devices 1610*a* to 1610*e*. The AI server 1620 may receive the input data from the AI devices 1610*a* to 1610*e*, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
    receiving a configuration related to periodic uplink transmission;
    performing a cell selection procedure;
    camping on a NarrowBand Internet of Things (NB-IoT) cell based on the cell selection procedure;
    configuring a periodic search timer based on a periodicity of the periodic uplink transmission;
    performing the periodic uplink transmission on the NB-IoT cell;
    entering to an any cell selection state upon expiry of the periodic search timer;
    performing a cell reselection procedure, while in the any cell selection state;
    camping on another cell based on the cell reselection procedure; and
    continuing the periodic uplink transmission on the another cell,
    wherein (1) the periodic search timer has an interval time of N times of the periodic uplink transmission and (2) N is a natural number,
    wherein the periodic search timer starts a duration for prohibiting cell selection before one transmission of the periodic uplink transmission is performed.

2. The method of claim 1, wherein the another cell is selected based on priority of radio access technology (RAT) including the another cell.

3. The method of claim 1, wherein the another cell is selected based on priority of frequency including the another cell.

4. The method of claim 1, wherein the cell reselection procedure is triggered upon expiry of the periodic search timer.

5. The method of claim 1, wherein the cell reselection procedure includes,
    performing a public land mobile network (PLMN) selection.

6. The method of claim 1, wherein the method further comprises,
    receiving, from the NB-IoT cell, information of RAT and/or frequency priority,
    wherein the cell reselection procedure is based on the received information.

7. The method of claim 1, wherein the another cell is a cell with a RAT other than an NB-IoT.

8. The method of claim 1, wherein the wireless device is in communication with at least one of a user equipment, a network, or an autonomous vehicle other than the wireless device.

9. A wireless device in a wireless communication system comprising:
    a transceiver;
    a memory; and
    at least one processor operatively coupled to the transceiver and the memory, and configured to:
    control the transceiver to receive a configuration related to periodic uplink transmission;
    perform a cell selection procedure;
    camp on a NarrowBand Internet of Things (NB-IoT) cell based on the cell selection procedure;
    configure a periodic search timer based on a periodicity of the periodic uplink transmission;
    control the transceiver to perform the periodic uplink transmission on the NB-IoT cell;
    enter to an any cell selection state upon expiry of the periodic search timer;
    perform a cell reselection procedure, while in the any cell selection state;
    camp on another cell based on the cell reselection procedure; and
    control the transceiver to continue the periodic uplink transmission on the another cell,
    wherein (1) the periodic search timer has an interval time of N times of the periodic uplink transmission and (2) N is a natural number,
    wherein the periodic search timer starts a duration for prohibiting cell selection before one transmission of the periodic uplink transmission is performed.

10. A non-transitory computer-readable medium having stored thereon a plurality of instructions, which, when executed by a processor of a wireless device, cause the wireless device to:
    receive a configuration related to periodic uplink transmission;
    perform a cell selection procedure;
    camp on a NarrowBand Internet of Things (NB-IoT) cell based on the cell selection procedure;
    configure a periodic search timer based on a periodicity of the periodic uplink transmission;
    perform the periodic uplink transmission on the NB-IoT cell;
    entering to an any cell selection state upon expiry of the periodic search timer;

performing a cell reselection procedure, while in the any cell selection state; transmission; and camping on another cell based on the cell reselection procedure; and continuing the periodic uplink transmission on the another cell, wherein (1) the periodic search timer has an interval time of N times of the periodic uplink transmission and (2) N is a natural number, wherein the periodic search timer starts a duration for prohibiting cell selection before one transmission of the periodic uplink transmission is performed.

* * * * *